(12) United States Patent
Kim

(10) Patent No.: US 7,544,069 B2
(45) Date of Patent: Jun. 9, 2009

(54) METHOD FOR FABRICATING THIN FILM PATTERN AND METHOD FOR FABRICATING FLAT PANEL DISPLAY DEVICE USING THE SAME

(75) Inventor: Jin Wuk Kim, Uiwang-si (KR)

(73) Assignee: LG Display Co., Ltd., Seoul (KR)

( * ) Notice: Subject to any disclaimer, the term of this patent is extended or adjusted under 35 U.S.C. 154(b) by 556 days.

(21) Appl. No.: 11/494,632

(22) Filed: Jul. 28, 2006

(65) Prior Publication Data
US 2007/0145004 A1  Jun. 28, 2007

(30) Foreign Application Priority Data
Dec. 26, 2005  (KR) ................... 10-2005-0129702

(51) Int. Cl.
*H01L 51/40* (2006.01)
*H01L 21/00* (2006.01)
*H01L 21/31* (2006.01)
*H01L 21/469* (2006.01)

(52) U.S. Cl. .................. 439/99; 438/149; 438/781; 438/790; 257/E51.027

(58) Field of Classification Search ................ 438/99, 438/149, 781, 790; 257/E51.027
See application file for complete search history.

(56) References Cited

U.S. PATENT DOCUMENTS

| | | | | |
|---|---|---|---|---|
| 6,037,635 A | * | 3/2000 | Yamazaki | ............... 257/353 |
| 6,955,767 B2 | * | 10/2005 | Chen | ..................... 216/40 |
| 7,226,804 B2 | * | 6/2007 | Shin et al. | ................ 438/82 |
| 7,465,612 B2 | * | 12/2008 | Chae et al. | .............. 438/149 |
| 2004/0262599 A1 | * | 12/2004 | Bernds et al. | ............ 257/40 |
| 2005/0170621 A1 | * | 8/2005 | Kim et al. | .............. 438/584 |
| 2006/0108905 A1 | * | 5/2006 | Cho et al. | .............. 313/292 |

\* cited by examiner

*Primary Examiner*—Charles D. Garber
*Assistant Examiner*—Ron E Pompey
(74) *Attorney, Agent, or Firm*—McKenna Long & Aldridge LLP

(57) ABSTRACT

A method for fabricating a thin film pattern and a method for fabricating a flat panel display device using the same to form an organic material pattern by not using a photo process are disclosed. The method for fabricating the thin film pattern includes forming a first conductive thin film pattern on a substrate; forming a master mold provided with a second thin film pattern; coating an organic material on the master mold provided with the second thin film pattern; joining the substrate and the master mold to contact the first thin film pattern and a surface of the substrate with the organic material; hardening the organic material; separating the substrate and the master mold from each other to provide an organic thin film pattern having step coverage formed by the second thin film pattern on a substrate provided with the first thin film pattern.

23 Claims, 21 Drawing Sheets

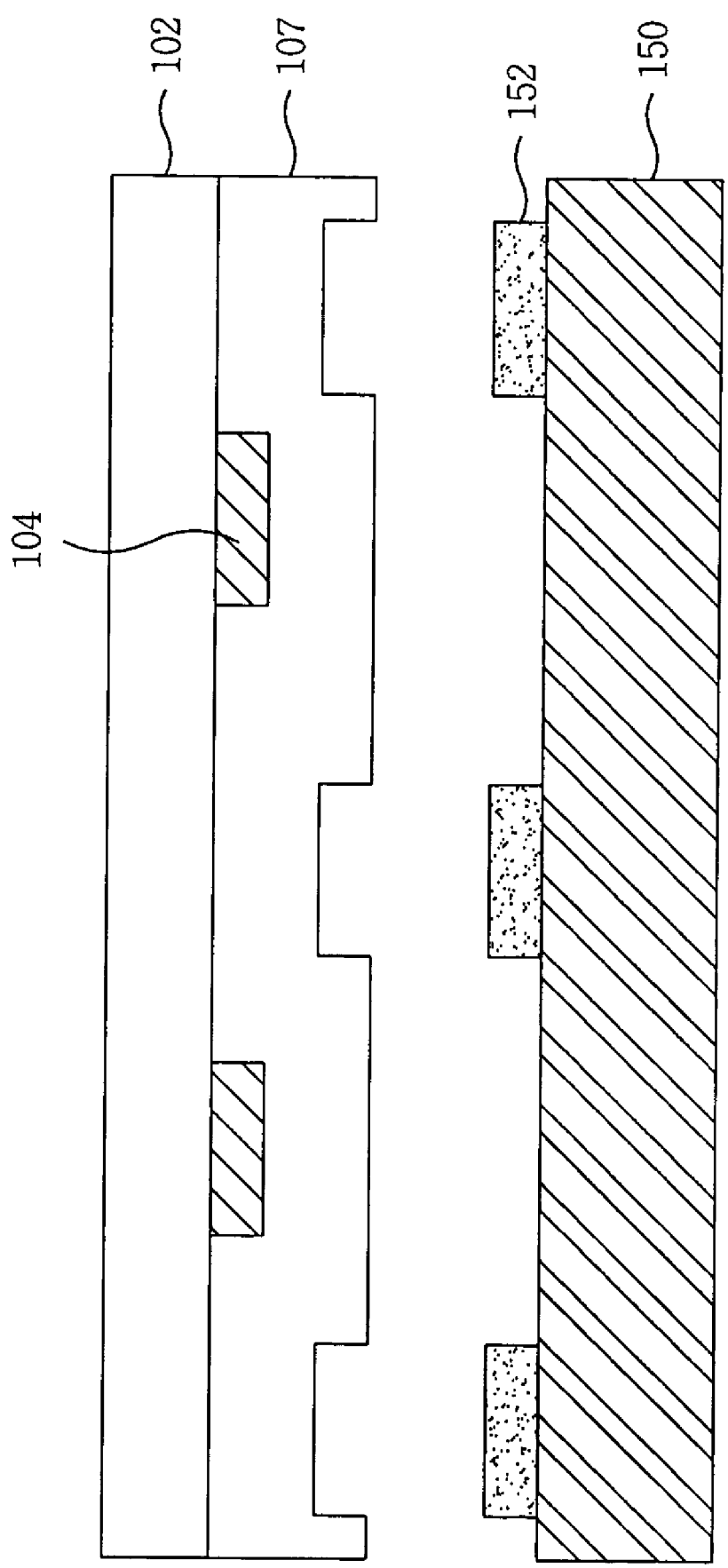

METHOD FOR FABRICATING THIN FILM PATTERN AND METHOD FOR FABRICATING FLAT PANEL DISPLAY DEVICE USING THE SAME

This application claims the benefit of Korean Patent Application No. P2005-129702 filed on Dec. 26, 2005, which is hereby incorporated by reference for all purposes as if fully set forth herein.

BACKGROUND OF THE INVENTION

1. Field of the Invention

This invention relates to a flat panel display device, and more particularly to a method for fabricating a thin film pattern and a method for fabricating a flat panel display device using the same that are adaptive for forming an organic material pattern by not using a photo-lithography process to control a capacitance value of a capacitor.

2. Discussion of the Related Art

The display device has become very important as a visual information communicating media in information society. A Cathode Ray Tube (CRT), which has been a main stream of the display device, has problems of heavy weight and bulky volume.

Flat panel display devices include a liquid crystal display device (LCD), a field emission display (FED), a plasma display panel (PDP) and an electro-luminescence (EL), etc.

Flat panel display devices include a plurality of thin film patterns, and each thin film pattern is formed by a photolithography process and an etching process.

FIG. 1A to FIG. 1C illustrate a manufacturing procedure in which a thin film pattern is formed using a photolithography process and an etching process.

First, referring to FIG. 1A, a metal layer 4a is deposited on substrate 2 for a flat panel display device by a deposition technique such as a sputtering, etc. Next, a photo-resist pattern 5 is formed by carrying out a photolithography process including a photo-resist coating, exposure and development process as shown in FIG. 1B. A first thin film pattern 4 is formed by carrying out the etching process using the photoresist pattern 5 as a mask as shown in FIG. 1C.

A plurality of thin film patterns are disposed by the photolithography process and the thin film patterns are electrically connected or electrically insulated to each other by an electrical contact of each thin film pattern. For example, if each metal thin film pattern wants to be electrically insulated, an insulating film would be used.

In FIG. 2, if a second thin film pattern 8 electrically separated from the first thin film pattern 4 formed by FIG. 1A to FIG. 1C is formed, an insulating film 6 is formed and then the second thin film pattern 8 is formed by the above-mentioned photolithography process and etching process.

The insulating film 6 is, may be formed by an inorganic insulating material such as SiNx, etc that is disposed by a deposition technique such as a PECVD, the sputtering, etc. In order to properly deposit the inorganic material, the disposing process would be performed at least twice.

The insulating film 6 formed of the inorganic insulating material has a drawback that allows a step coverage formed by the first thin film pattern 4 positioning at a lower portion so as to be kept to decrease a smoothing degree on the substrate 2. In order to make up for the drawback of the inorganic insulating film 6, as shown in FIG. 3, a technique for providing an organic insulating film 7 formed of an organic material has been suggested. Unlike the inorganic insulating film 6, the organic material is not coated by a deposition technique such as the PECVD, the sputtering, etc., instead, a coating technique, such as a spin coating or spinless coating, etc., is used to provide the organic insulating film 7. The organic insulating film 7 unlike the inorganic insulating film 6 removes a step coverage generated by the first thin film pattern 4. Also, the organic insulating film 7 has a more simple manufacturing process and cheaper cost than the inorganic insulating film 6.

When a first metal thin film pattern and a second metal thin film pattern are insulated from each other by the insulating material and a current or a voltage is supplied to each metal thin film pattern, a parasitic capacitor is formed between the metal thin film patterns.

For example, if the current or the voltage is supplied to the first thin film pattern 4 and the second thin film pattern 8, a first parasitic capacitor A is formed between the first thin film pattern 4 and the second thin film pattern 8. Also, if a third thin film pattern 10 is formed, a second parasitic capacitor B is formed between the first thin film pattern 4 and the third thin film pattern 10.

The capacitance values of such parasitic capacitors A and B can be adjusted to be small or large in accordance with a user's requirement. For this, it requires that a thickness of the organic insulating film 7 is controlled as shown in Equation (1).

$$C = \varepsilon \frac{A}{d} \quad (1)$$

wherein $\varepsilon$ represents a dielectric constant; d represents a distance between the electrodes and A represents an electrode area.

A capacitor is inversely proportional to a distance between the electrodes like equation 1. Thus, the thickness of the organic insulating film 7 is controlled to adjust the capacitance value of the parasitic capacitor.

However, referring to FIG. 4, if step coverage of the organic insulating film 7 is formed to reduce the distance between the first thin film pattern 4 and the third thin film pattern 10, a photolithography process using a mask is required.

For example, the organic insulating material is coated, and the organic insulating material is partially exposed and developed by using a half tone mask, etc. so that the organic insulating film 7 having step coverage is provided.

In this case, the exposure, the development process and a mask manufacturing cost, etc. are added to the photolithography process using the mask. Therefore, forming the organic insulating film 7 having step coverage has a problem in that the manufacturing process is complicated and the cost is increased.

SUMMARY OF THE INVENTION

Accordingly, the present invention is directed to a method for fabricating a thin film pattern and method for fabricating a flat panel display device using the same that substantially obviates one or more problems due to limitations and disadvantages of the related art.

An advantage of the present invention is to provide a method for fabricating a thin film pattern and a method for fabricating a flat panel display device using the same that are adaptive for forming an organic material pattern by not using a photolithography process to control a capacitance value of a capacitor.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages of the invention, a method for fabricating a thin film pattern according to one aspect of the present invention comprises forming a first conductive thin film pattern on a substrate; forming the master mold provided with a second thin film pattern; coating an organic material on the master mold provided with the second thin film pattern; joining the substrate and the master mold in such a manner to contact the first thin film pattern and a surface of the substrate with the organic material; hardening the organic material; and separating the substrate from the master mold to provide an organic thin film pattern having step coverage formed by the second thin film pattern on a substrate provided with the first thin film pattern.

In another aspect of the present invention, a method for fabricating a flat panel display device according to one aspect of the present invention comprises forming a gate line and a gate pattern including a gate electrode contacted with the gate line on a substrate; preparing a master mold including a designated thin film pattern; coating an organic material on a master mold provided with the thin film pattern; joining the substrate and the master mold in such a manner to contact the gate pattern and the surface of the substrate with the organic material, and in such a manner to face the thin film pattern and the gate line each other; hardening the organic material; and separating the substrate from the master mold to provide an organic gate insulating film having a relatively thin thickness at an area that is overlapped with the gate line on the substrate.

In another aspect of the present invention, a method for fabricating the flat panel display device includes forming a semiconductor pattern on the organic gate insulating film; forming a source electrode, a drain electrode and a data line crossing the gate line on the semiconductor pattern; forming a protective film having a contact hole for exposing the drain electrode; and forming a pixel electrode for comprising a storage capacitor along with the gate line with having an organic gate insulating film contacted, via the contact hole, with the drain electrode, and having a relatively thin thickness therebetween.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5A to FIG. 5F illustrate a method for fabricating a thin film pattern according to an embodiment of the present invention;

DETAILED DESCRIPTION OF THE ILLUSTRATED EMBODIMENTS

Reference will now be made in detail to embodiments of the present invention, examples of which are illustrated in the accompanying drawings.

FIG. 5A to FIG. 5F illustrate a method for fabricating a thin film pattern according to the present invention, especially a method for forming an organic material pattern having step coverage.

Figure 1A:
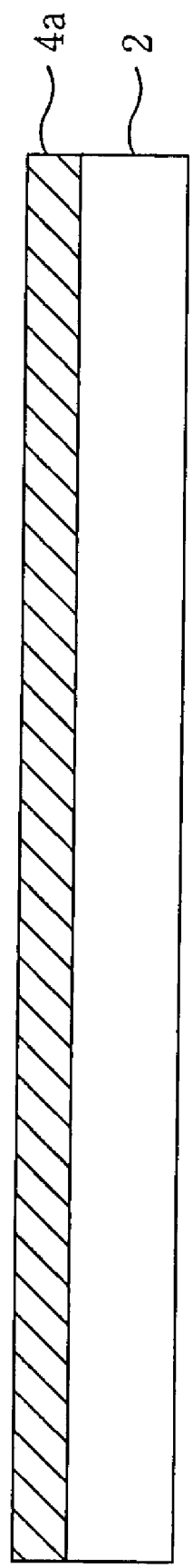
FIG. 1A to FIG. 1C illustrate a manufacturing process in which a thin film pattern is formed using a photolithography process and a etching process.
Figure 1B:
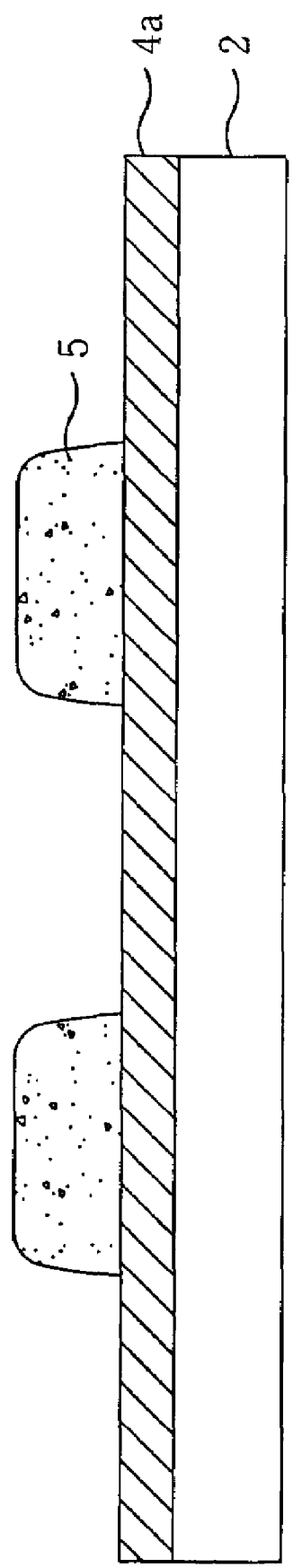
Figure 1C:
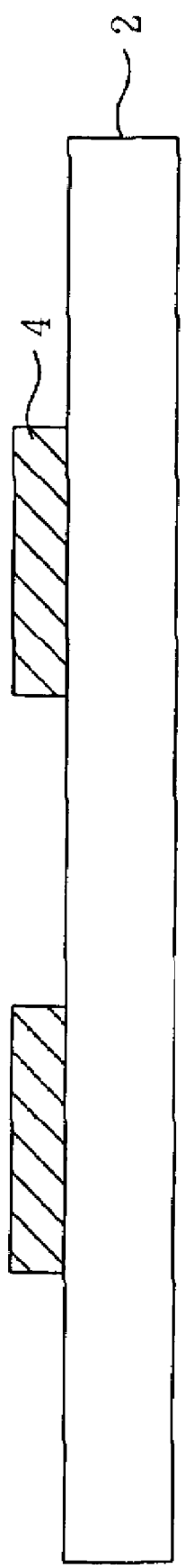
Figure 2:
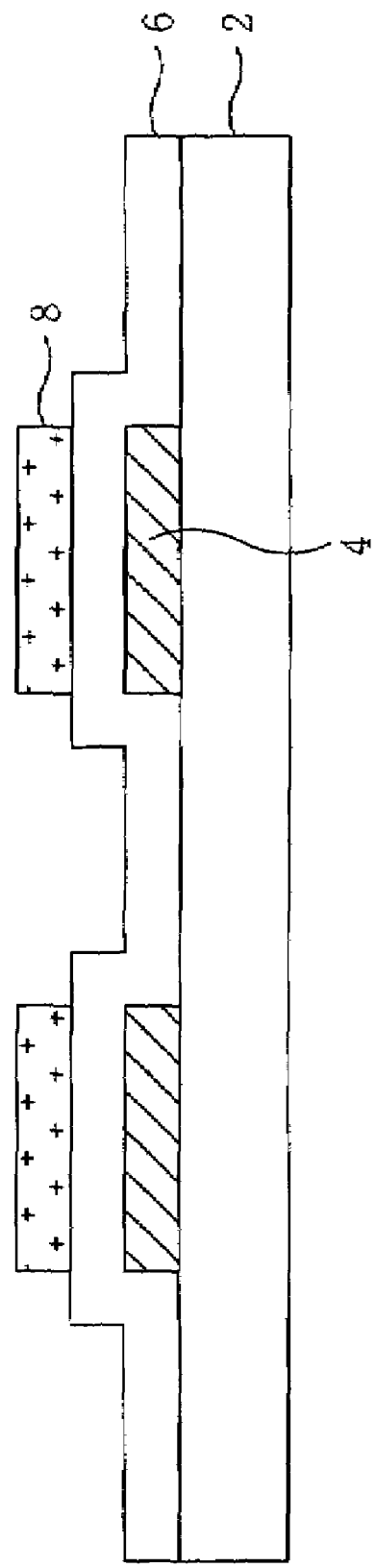
FIG. 2 illustrates the thin film patterns insulated by an inorganic insulating film.
Figure 3:
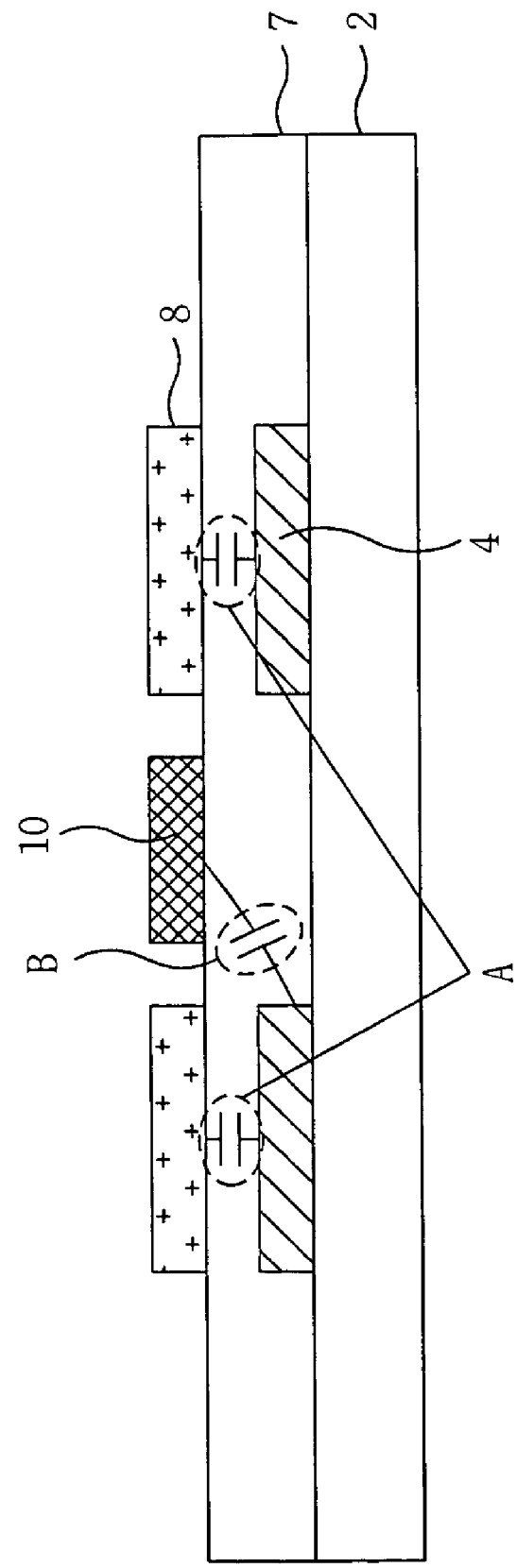
FIG. 3 illustrates the thin film patterns insulated by an organic insulating film.
Figure 4:
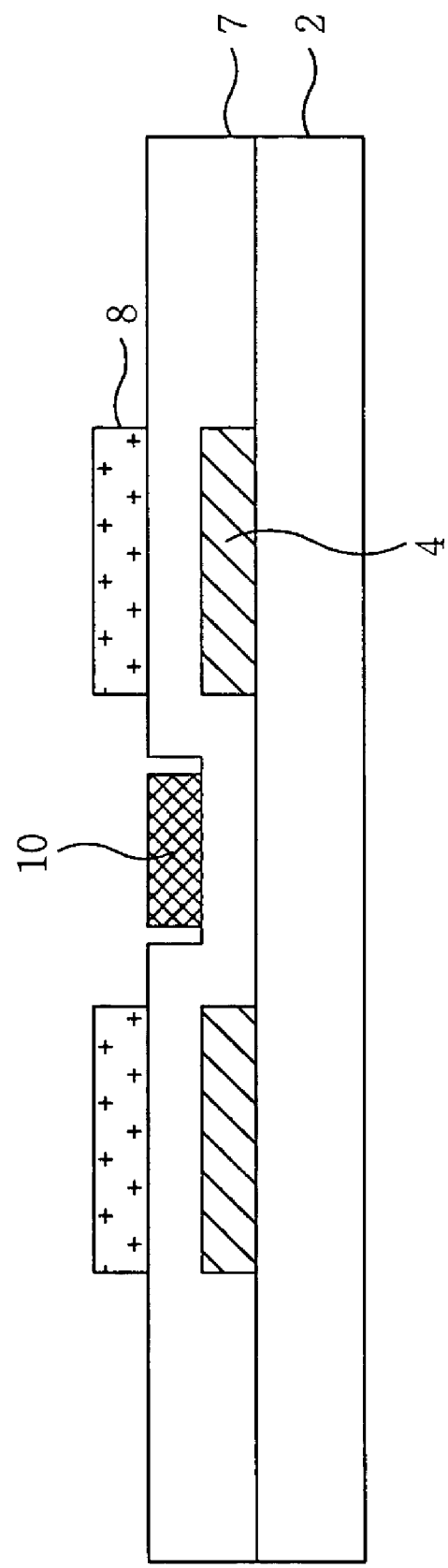
FIG. 4 illustrates the thin film patterns insulated by an organic insulating film having step coverage.
Figure 5A:
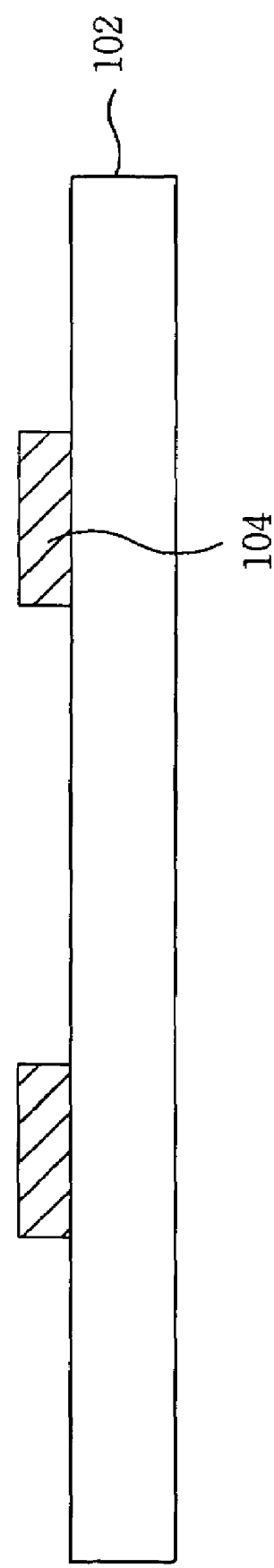

First, referring to FIG. 5A, a first thin film pattern 104 is formed on a substrate 102 by the same process as the photolithography process and the etching process shown in FIG. 1A to FIG. 1C.

Figure 5B:
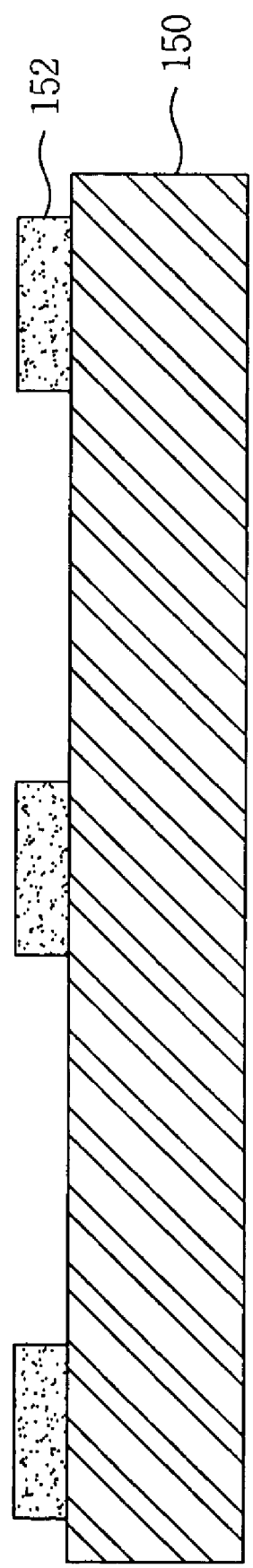
Figure 5C:
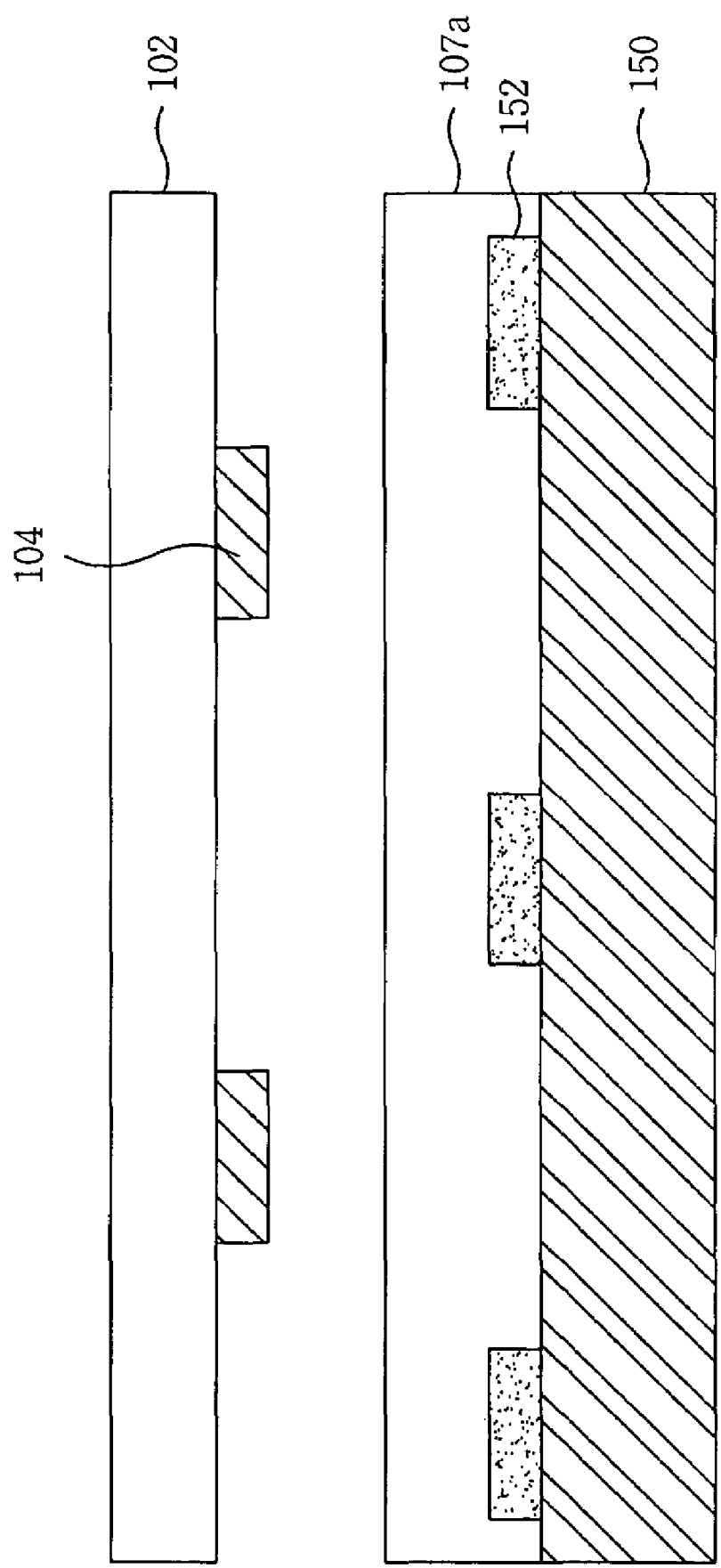

Next, referring to FIG. 5B, a master mold 150 having a second thin film pattern 152 positioned at a corresponding area where a relatively low height at the final organic material pattern is formed is prepared.

The master mold 150 is made of (Poly-di-methyl-siloxane) PDMS or a glass.

Next, an organic material 107a for the organic material pattern for being formed on the substrate 102 provided with the first thin film pattern 104 is coated on the master mold 150. The organic material 107a includes a photo-cross-linked material or a thermoset organic material. After that, in FIG. 5C, the substrate 102 is aligned on the master mold 150 in which the organic material 107a and the first thin film pattern 104 are faced to each other.

Figure 5D:
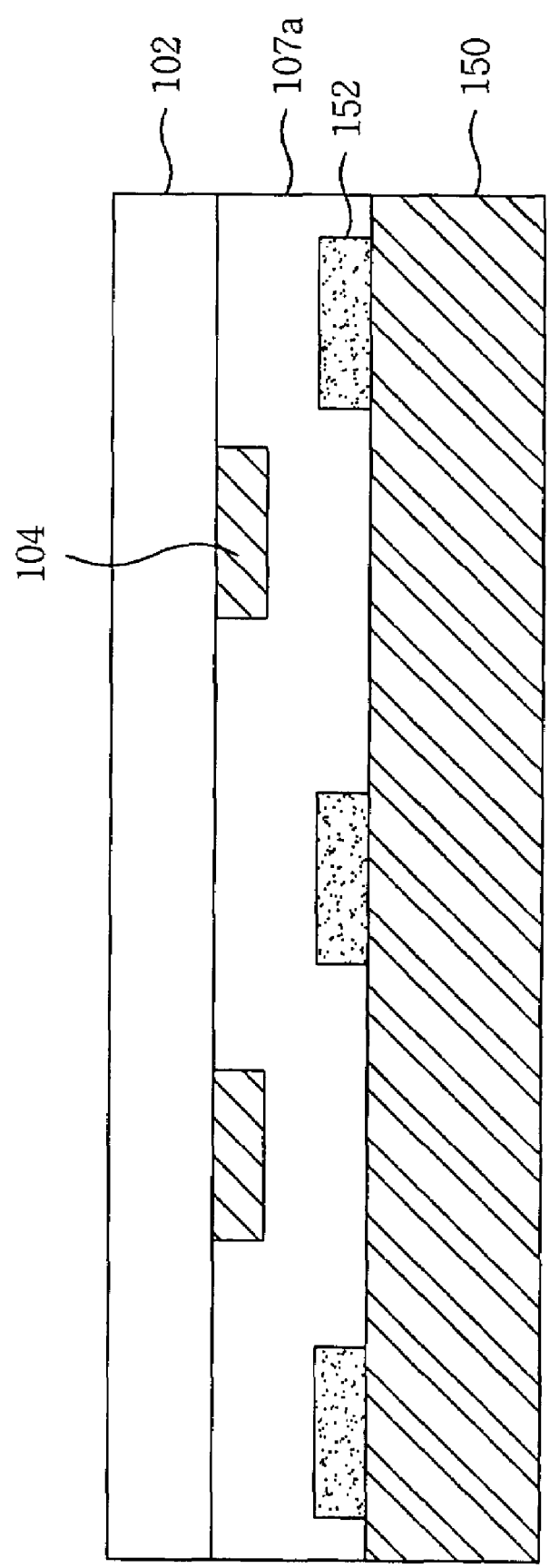

Next, referring to FIG. 5D, the substrate 102 is joined with the master mold 150 so that the first thin film pattern 104 contacts the organic material 107a.

Next, the organic material 107a is hardened by a light curing process using an ultraviolet ray or a thermal curing process. Next, the substrate 102 is separated from the master mold 150. At that time, referring to FIG. 5E, the organic material 107a is transferred and attached to the substrate 102. Accordingly, the organic thin film pattern 107 having step coverage is formed on the substrate 102.

Figure 5F:
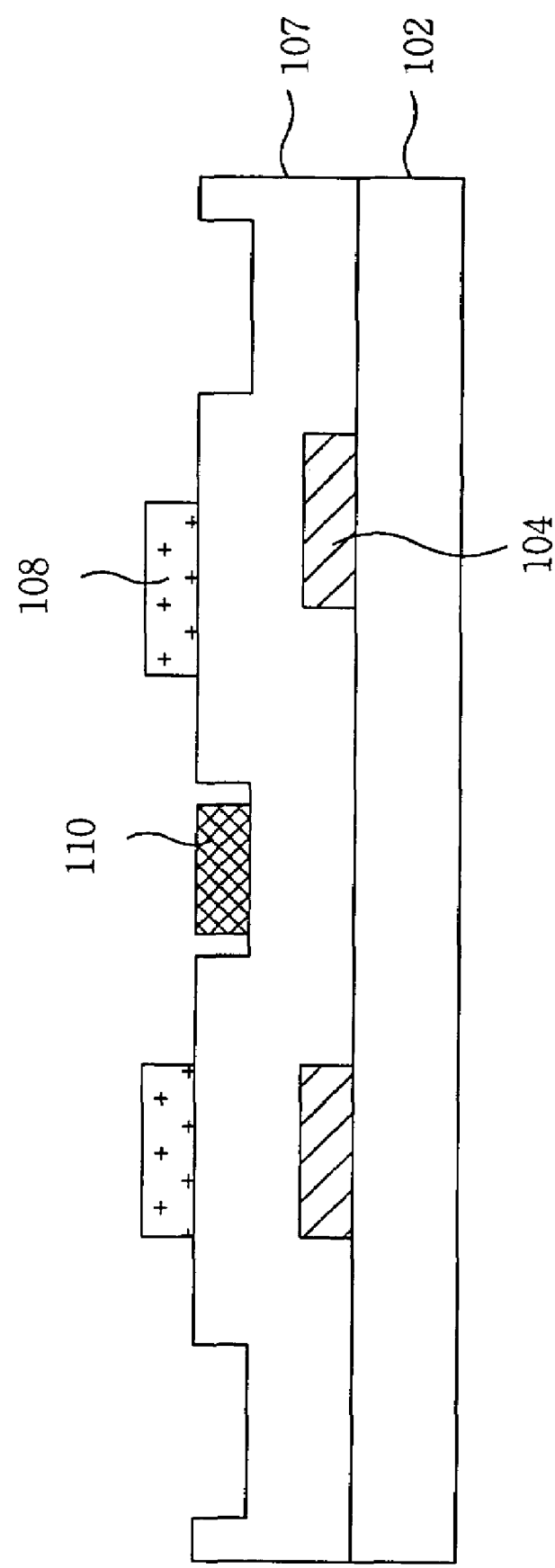

Next, referring to FIG. 5F, second or third metal thin film patterns 108 or 110 are formed on the organic insulating film 107 by carrying out another process such as the photolithography process, etc.

As described above, the organic thin film pattern having step coverage according to the present invention is formed by using a device such as a master mold and a difference of a surface energy, not a photolithography process.

Hereinafter, a technical background that is adaptive for forming the organic thin film pattern 107 having step coverage shown in FIG. 5A to FIG. 5F and a condition of a technical implementation will be specifically described.

First, in FIG. 5D, when the organic material 107a is separated from the master mold 150 to attach to the substrate 102 provided with the first thin film pattern 104, a surface energy γ1 of the substrate 102 must be greater than a surface energy γ2 of the organic material 107a and a surface energy γ3 of the master mold 150. (γ1>γ2 and γ1>γ3)

Herein, the surface energy γ refers to required energy for a material to make an interface with atmosphere. A material having a high surface energy γ is difficult to make an interface with atmosphere, because the energy for making an interface with the atmosphere is high. And the material having the high surface energy γ makes easily the interface with the material having the lower surface energy γ. In other words, when a fluidity material having a low surface energy γ is deposited on the surface of a solid material having a high surface energy γ, the fluidity material can widely spread on the surface of solid material. Because, the fluidity material has stronger property to make an interface with atmosphere than the solid material, while the solid material makes an interface with the fluidity material than with the atmosphere. When a resin material (its surface energy is γ2) deposited on the first solid material having the surface energy γ3 contacts the second solid material having the surface energy γ1, and if the γ1 is greater than γ2 and γ3, then the resin material is transferred to the second solid material because the first material more easily makes an interface with the atmosphere than the second solid material and the resin material more easily makes an interface with the second solid material than with the first solid material.

By using a difference of the surface energy γ as discussed above, the organic material 107a can be easily separated from the master mold 150 having a low surface energy γ. On the other hand, the substrate 102 having a relatively high surface energy γ has a strong property that makes an interface with the organic material 107a having a low surface energy γ. In other words, a property that makes an interface with the organic material 107a means that it has a strong adhesive force to each other.

Accordingly, this invention forms an organic thin film pattern having step coverage using a molding process utilizing the characteristics of the surface energy γ.

To this end, the surface energy of the substrate 102 is more than about 70 mN/m.(Herein, mN/m unit can be replaced with mJ/m2) Generally, the surface energy of a glass substrate is more than about 100 mN/m. However, if a substrate having the surface energy less than about 40 mN/m is used, the surface energy should be increased to more than about 70 mN/m by an $O_2$ plasma process. In other words, a degree of a hydrophilic is proportional to the surface energy. Therefore, the substrate 102 should be hydrophilized to have the surface energy more than about 70 mN/m by the $O_2$ plasma process.

When a glass is used for the master mold 150, the surface of the master mold substrate 150 is hydrophobilized by a $CF_4$ and $SF_6$ plasma process including, for example, fluorine F to lower a value of the surface energy at approximately 15~40 mN/m. Because the surface energy must be relatively lower than that of the substrate 102 which is generally made of glass and provided with the first thin film pattern 104.

The organic material 107a must be a resin of a liquid high polymer precursor, and its surface energy must be relatively lower than that of the substrate 102 provided with the first thin film pattern 104. For example, the resin of the liquid high polymer precursor is formed by adding at least one photoinitiator of the phosphine oxide and the ketone to the Acrlate-group monomer. Specifically, the Acrlate-group monomer content within the resin of the liquid high polymer precursor is approximately 90~98%, and at least one content of the phosphine oxide and the ketone is approximately 2~10%.

The surface energy of the resin of the liquid high polymer precursor is preferably approximately 20~44 mN/m.

Accordingly, the surface energy γ1 of the substrate 102 must be greater than the surface energy γ2 of the organic material 107a and the surface energy γ3 of the master mold 150. (γ1>γ2 and γ1>γ3)

Therefore, the adhesive force between the substrate 102 having the relatively greatest surface energy and the organic material 107a increases, while the adhesive force between the organic material 107a and the master mold 150 decreases. As a result, the organic material 107a is transferred and attached to the substrate 102 provided with the first thin film pattern 104.

A condition in accordance with an interface area in addition to the above-mentioned surface energy may be added.

In other words, if the organic material 107a on the master mold 150 is transferred on the substrate 102, it must satisfy equation 2.

$$A_{23}(\gamma 2+\gamma 3-\gamma 23) < A_{12}(\gamma 2+\gamma 1-\gamma 12) \quad (2)$$

wherein $A_{23}$ represents a contact area between the organic material and the master mold substrate; $A_{12}$ represents a contact area between the organic material and the substrate; γ23 represents a surface energy between the organic material and the master mold substrate and γ12 represents a surface energy between the substrate and the organic material.

When a number of the second thin film pattern 108 formed on the master mold substrate 150 increases, the contact area $A_{23}$ is increased. When a number of the first thin film pattern 104 formed on the substrate 102 increases, the contact area A12 is increased. As a result, A23 and A12 are differentiated depending upon the number of each thin film pattern.

Accordingly, the result of equation 2 is differentiated by a value of A23 and A12. Each case will be described in detail.

First, if A23≦A12 or A23/A12<1.5, then the value of γ23 must be increased and the value of γ12 must be decreased. To increase γ23 means that an increase of a repulsive force between the organic material 107a and the master mold substrate 150, and to decrease the γ12 means that an increase of an adhesive force between the organic material 107a and the master mold substrate 150. As the substrate 102 is hydrophilic and the master mold 150 is hydrophobic, if the hydrophilic organic material 107a is used, the value of γ23 can be increased, and the value of γ12 can be decreased.

As a result, if A23≦A12 or A23/A12<1.5, then a hydrophilic degree of the organic material 107a should be adjusted to satisfy equation 1. The hydrophilic organic material 107a uses a hydrophilic Acrlate monomer to hydrophilize the organic material 107a. Otherwise, the surface of the organic material 107a can be hydriphilized by the $O_2$ plasma process.

Next, if A23/A12>1.5, then it is somewhat difficult to satisfy equation. In this case, an adhesive material as a primer is formed at the surface of the organic material 107a by using a spray or a coating technique. Accordingly, the organic material 107a can be attached on the substrate 102 provided with the first thin film pattern 104.

As a result, the organic thin film pattern 107 having step coverage can be formed on the substrate 102 provided with the first thin film pattern 104.

Hereinafter, the method for fabricating the organic thin film pattern having step coverage formed by the above-mentioned system will be employed to manufacture a thin film transistor array substrate of the liquid crystal display panel with reference to FIG. 6 to FIG. 10E.

Figure 6:
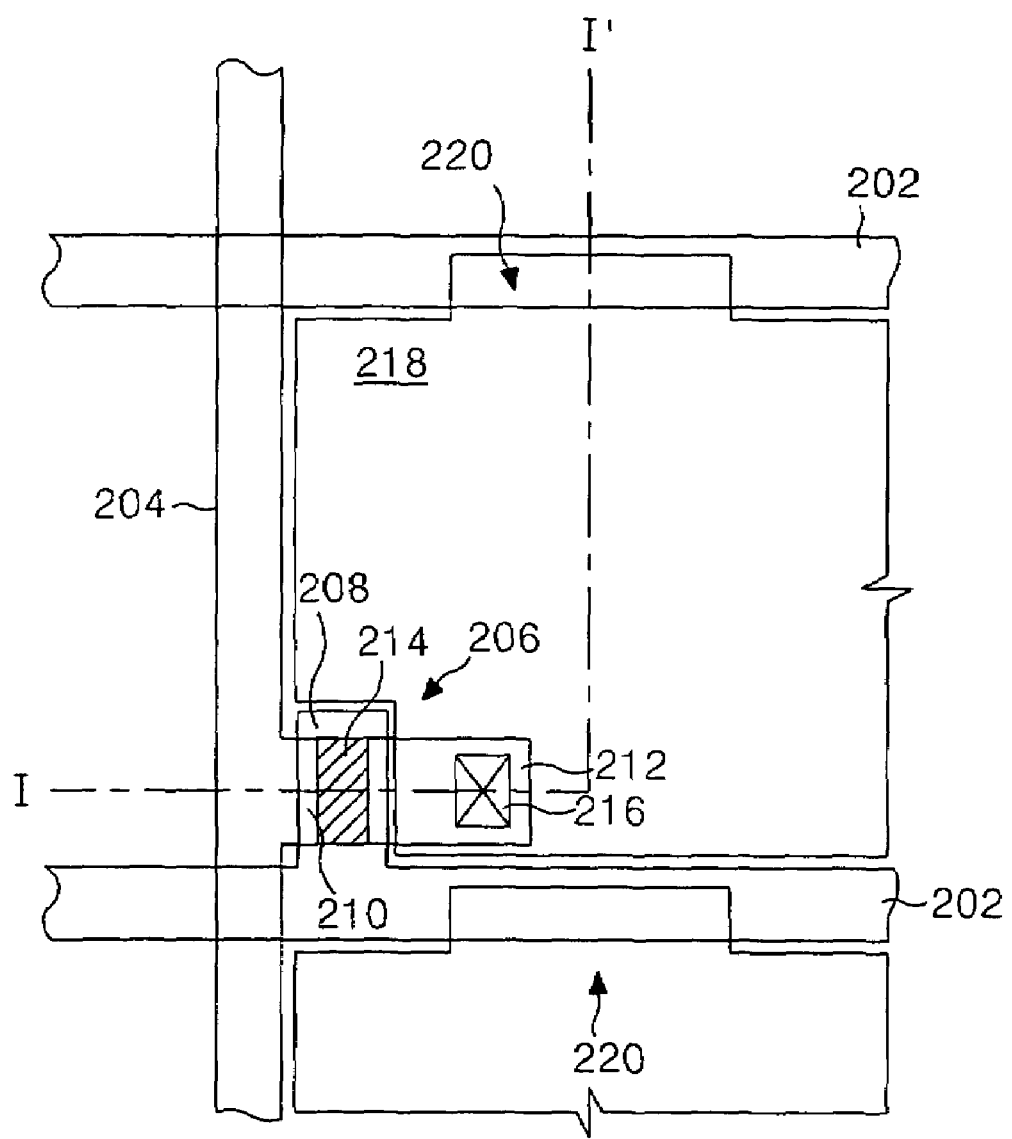
FIG. 6 is a plan view showing a structure of a thin film transistor array substrate of a liquid crystal display device.
Figure 7:
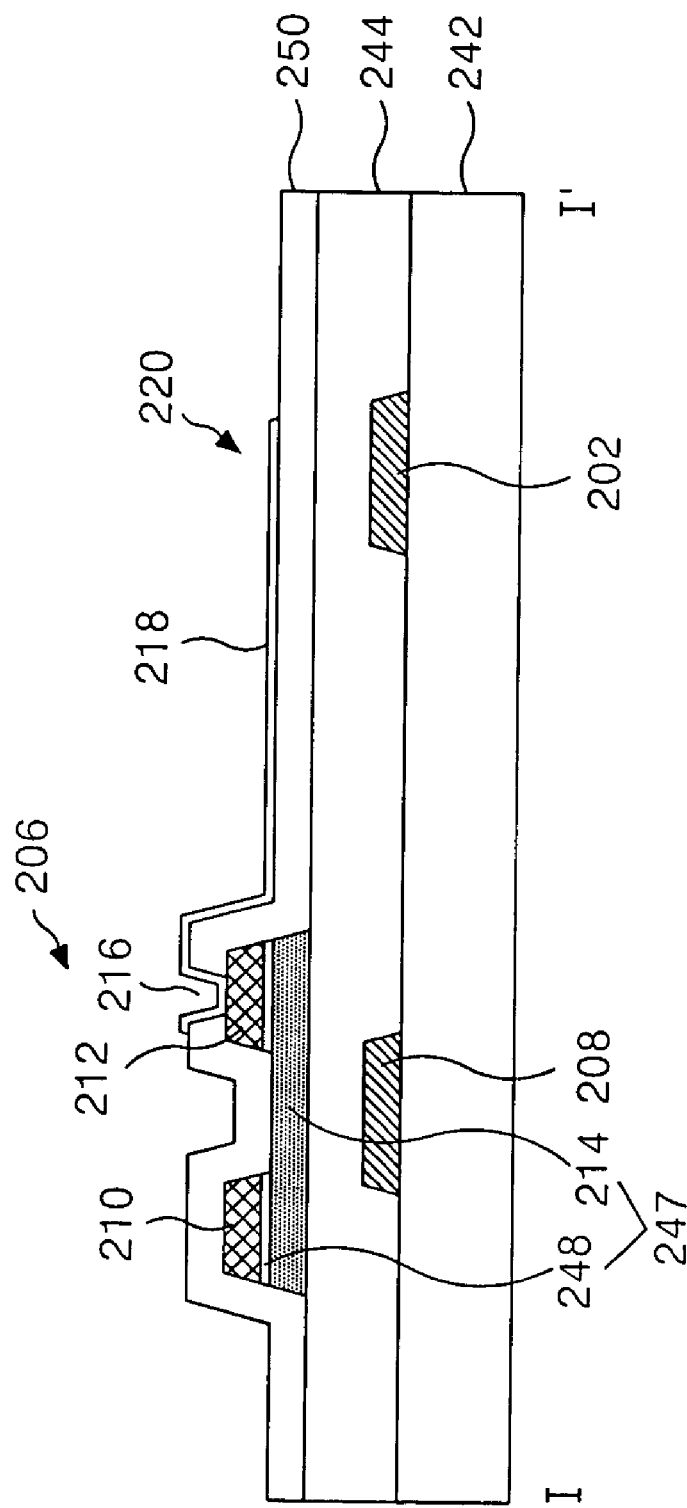
FIG. 7 is a sectional view taken along the □-□' line in FIG. 6.

First, FIG. 6 is a plan view showing a structure of a thin film transistor array substrate, and FIG. 7 is a sectional view of the thin film transistor array substrate taken along the I-I' line in FIG. 6.

Referring to FIG. 6 and FIG. 7, the thin film transistor array substrate comprises a gate line 202 and a data line 204 provided on a lower substrate 242 in such a manner to cross each other with an organic gate insulating film 244 therebetween, a thin film transistor 206 (hereinafter, TFT) provided at each crossing, and a pixel electrode 218 provided at a cell area having a crossing structure. Further, the TFT array substrate includes a storage capacitor 220 provided at an overlapped portion between the pixel electrode 218 and a pre-stage gate line 202.

The TFT 206 includes a gate electrode 208 connected to a gate line 202, a source electrode 210 connected to a data line 204, a drain electrode 212 connected to the pixel electrode 218, and an active layer 214 overlapping the gate electrode 208 to define a channel having the source electrode 210 and the drain electrode 212 therebetween. The active layer 214 is formed in such a manner to overlap with the data line 204, the source electrode 210 and the drain electrode 212, and further includes a channel portion between the source electrode 210 and the drain electrode 212. The data line 204 and an ohmic contact layer 248 for making an ohmic contact with the source electrode 210 and the drain electrode 212 are further formed on the active layer 214. Herein, the active layer 214 and the ohmic contact layer 248 refer to a semiconductor pattern 247.

The TFT 206 allows a pixel voltage signal applied to the data line 204 to be charged into the pixel electrode 218 and be kept in response to a gate signal applied to the gate line 202.

The pixel electrode 218 is connected, via a contact hole 216 passing through a protective film 250, to the drain electrode 212 of the thin film transistor 206. The pixel electrode 218 generates a potential difference with respect to a common electrode provided at an upper substrate (not shown) by the charged pixel voltage signal. This potential difference rotates a liquid crystal positioned between the thin film transistor array substrate and the upper substrate owing to a dielectric anisotropy and transmits a light input, via the pixel electrode 218, from a light source (not shown) toward the upper substrate.

The storage capacitor 220 is formed by the pre-stage gate line 202 and the pixel electrode 218. The organic gate insulating film 244 and the protective film 250 are positioned between the gate line 202 and the pixel electrode 218. The storage capacitor 220 allows the pixel voltage charged in the pixel electrode 218 to be stably maintained until the next pixel voltage is charged.

Figure 8:
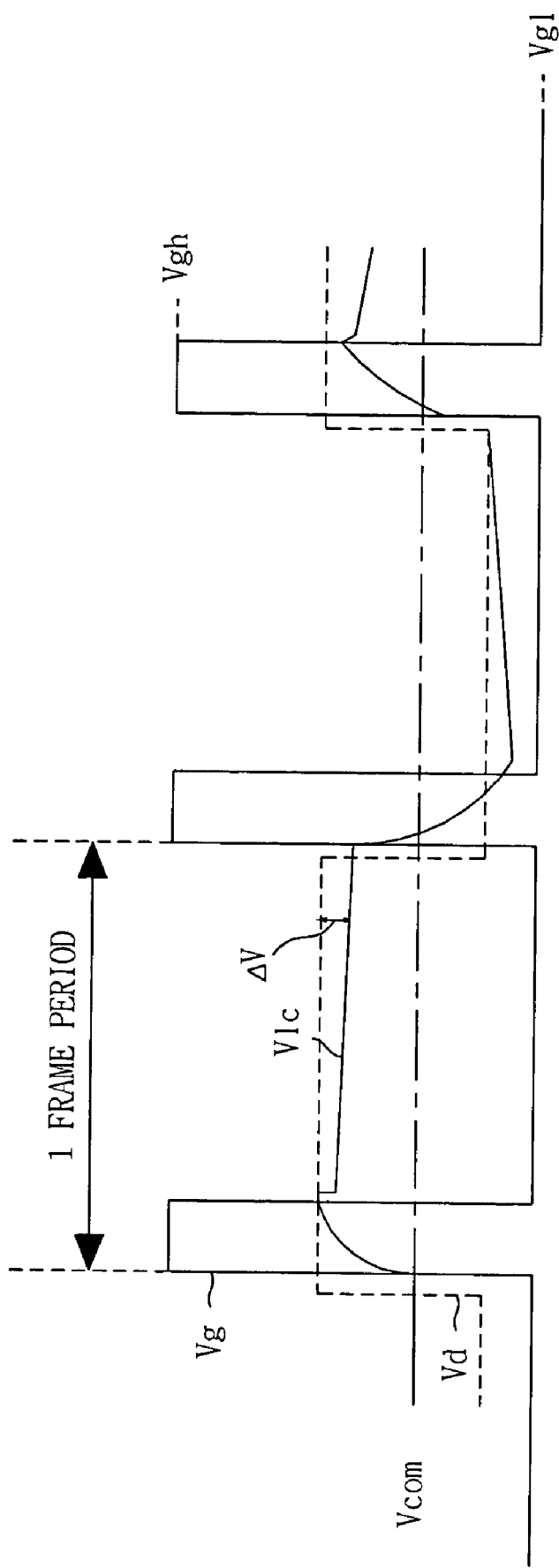
FIG. 8 is a waveform diagram showing voltages supplied to the liquid crystal display device.

In the TFT array substrate, as shown in FIG. 8, the gate electrode 208 of the TFT 206 is supplied with a gate voltage Vg and the source electrode 210 thereof is supplied with a data voltage Vd. If the gate voltage Vg more than a threshold voltage is applied to a gate electrode 208 of the TFT 206, then a channel is formed between the source electrode 210 and the drain electrode 212, and the data voltage Vd is charged, from the source electrode 210 to the drain electrode 212 of the TFT. Finally the data voltage is charged into the liquid crystal cell Clc and the storage capacitor 220 Cst.

Herein, a feed-through Voltage ΔVp, that is, a difference between the data voltage Vd and a voltage Vlc charged in the liquid crystal cell Clc is defined by the following equation:

$$\Delta Vp = \frac{Cgd}{Cgd + Clc + Cst} \Delta Vg \quad (3)$$

wherein Cgd is a parasitic capacitor formed between the gate electrode and the drain electrode of the TFT, and ΔVg is a difference voltage between a voltage Vgh and a voltage Vgl.

Such a feed-through voltage ΔVp causes a deterioration of picture quality such as a residual image, for example, a flicker. Accordingly, the deterioration of picture quality is reduced by maximizing a capacitance value Cst of the storage capacitor 120 in order to minimize the feed-through voltage ΔVp as indicated in the above equation (3). Here, the Clc is almost fixed value, so it is hard to increase this value. To increase the Cgd is also increasing the numerator of the equation (3). Therefore, to increase Cgd is not good solution for increasing the feed-through voltage.

Referring to equation (3), the capacitance value Cst of the storage capacitor 220 is proportional to an area A of the electrode, and is inversely proportional to a length between the electrodes. In this case, if an area of the electrode is widened in order to increase the capacitance value Cst of the storage capacitor 220, then there is raised a problem in that an aperture ratio is reduced.

As a result, the area is fixed so that the length between the electrodes should be reduced to maximize the capacitance value Cst of the storage capacitor 220.

Figure 9:
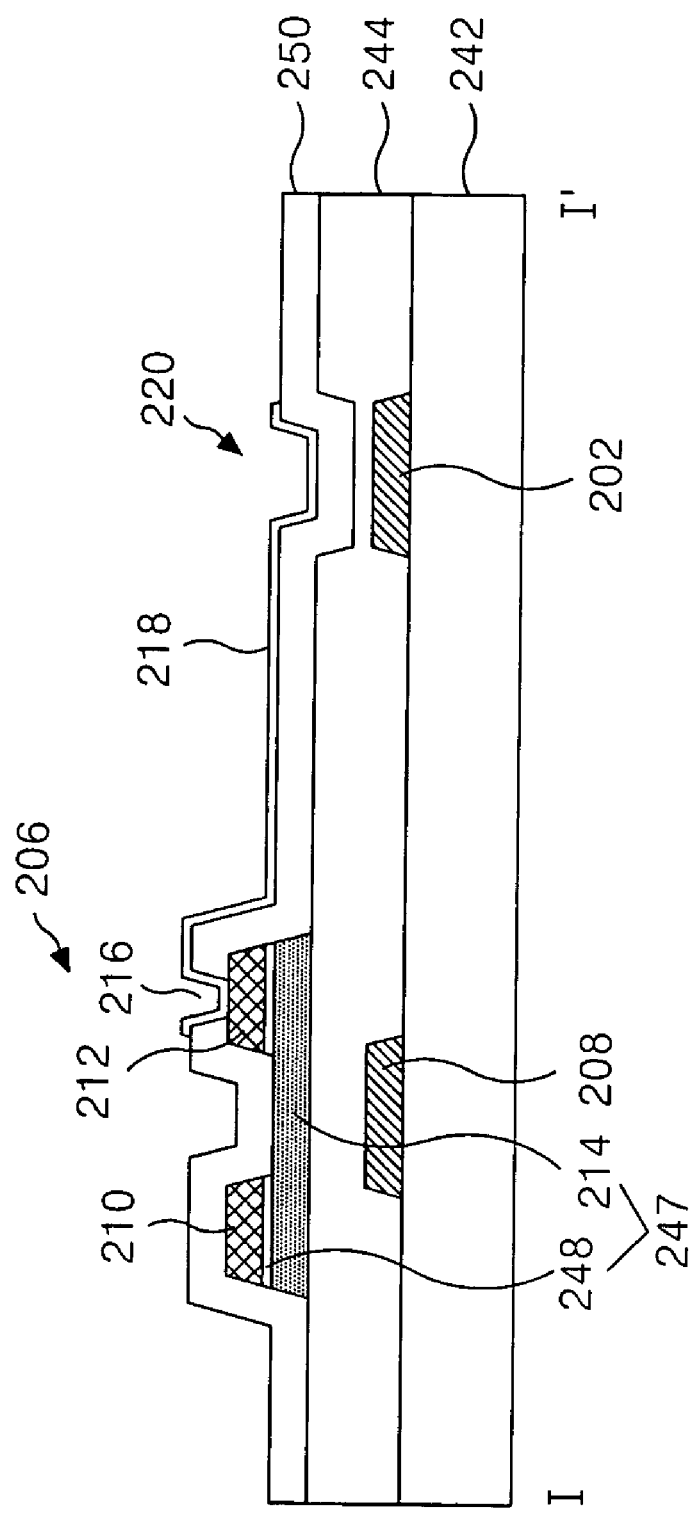
FIG. 9 is a sectional view showing a thin film transistor array substrate including a gate insulating film formed by the method for fabricating the thin film pattern shown in FIG. 5A to FIG. 5F.

In FIG. 9, the organic gate insulating film 244 having step coverage at the storage capacitor 220 is formed using the organic material pattern formation technique having step coverage disclosed above. Accordingly, a distance between the pixel electrode 218 and the gate line 202 consisting of the storage capacitor 220 can be reduced to maximize the capacitance value Cst of the storage capacitor 220.

As a result, a feed-through voltage ΔVp is minimized, so that it becomes possible to reduce a deterioration of a picture quality.

Hereinafter, the method for fabricating the thin film transistor array substrate shown in FIG. 6 will be described with reference to FIG. 10A to FIG. 10D.

Figure 10A:
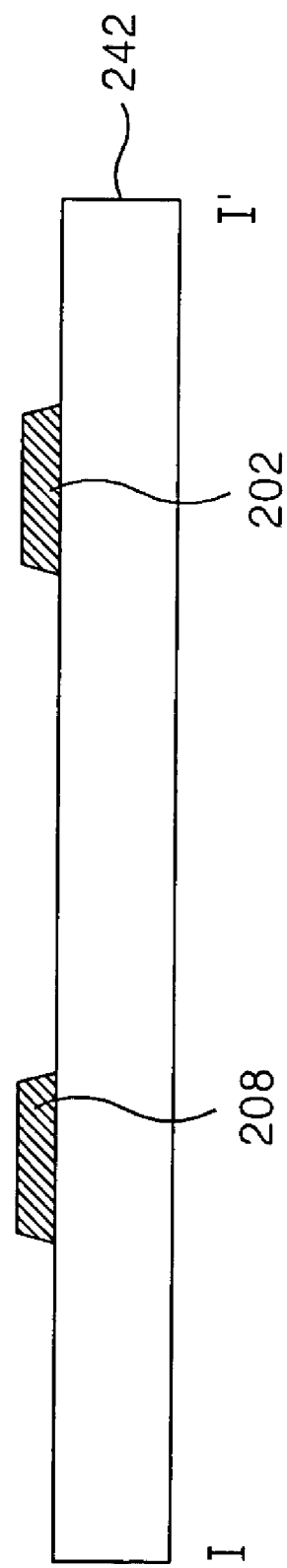
FIG. 10A to FIG. 10E illustrate the method for fabricating the thin film transistor array substrate shown in FIG. 6.

First, a gate metal layer is formed on the lower substrate 242 by a deposition technique such as sputtering, etc. Then, the gate metal layer is patterned by a photolithography and a etching process to provide gate metal patterns including a gate line 202, and a gate electrode 208 as shown in FIG. 10A.

Figure 10B:
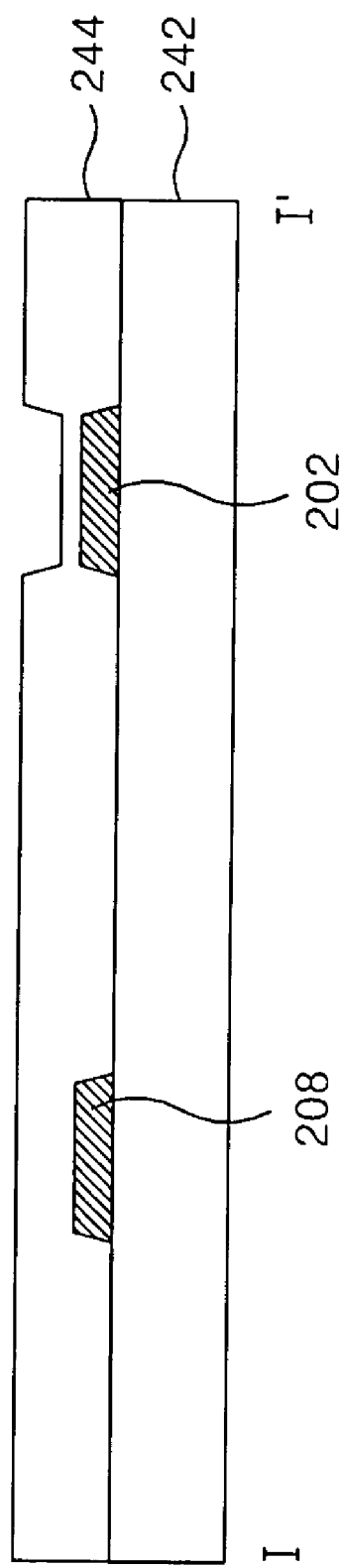

Next, in FIG. 10B, the stepped organic gate insulating film 244 has a relatively low thickness at an area overlapping the gate line 202 and is formed using the method for fabricating the thin film pattern as shown in FIG. 5A to FIG. 5F. In particular, the gate line 202 and the gate electrode 208 in FIG. 10A correspond to the first thin film pattern 104 in FIG. 5A, and the organic gate insulating film 244 in FIG. 10B corresponds to the stepped organic thin film pattern 107 in FIG. 5F. The method for fabricating the organic gate insulating film 244 is the same as the method shown in FIG. 5A to FIG. 5F. Accordingly, the detailed explanation will not be mentioned again.

An amorphous silicon layer, an n+ amorphous silicon layer and a source/drain metal layer are sequentially provided on the lower substrate 242 provided with the organic gate insulating film 244.

Figure 10C:
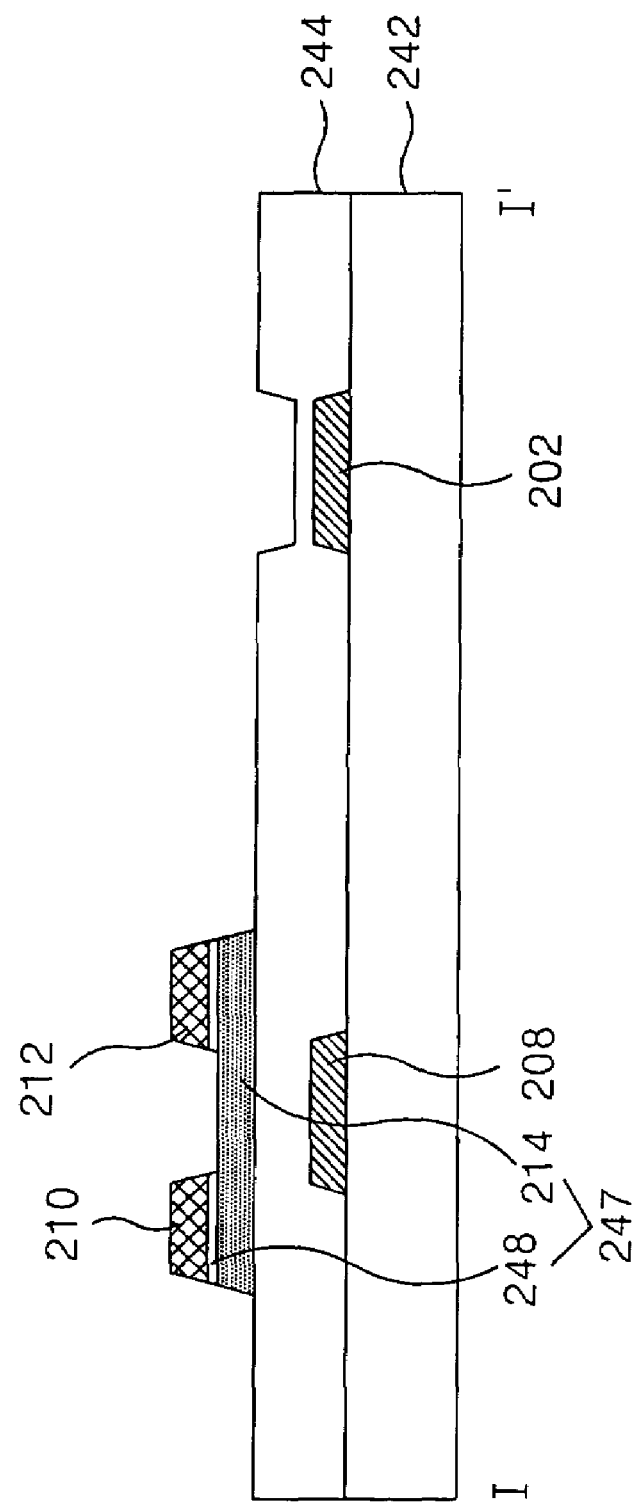
Figure 10D:
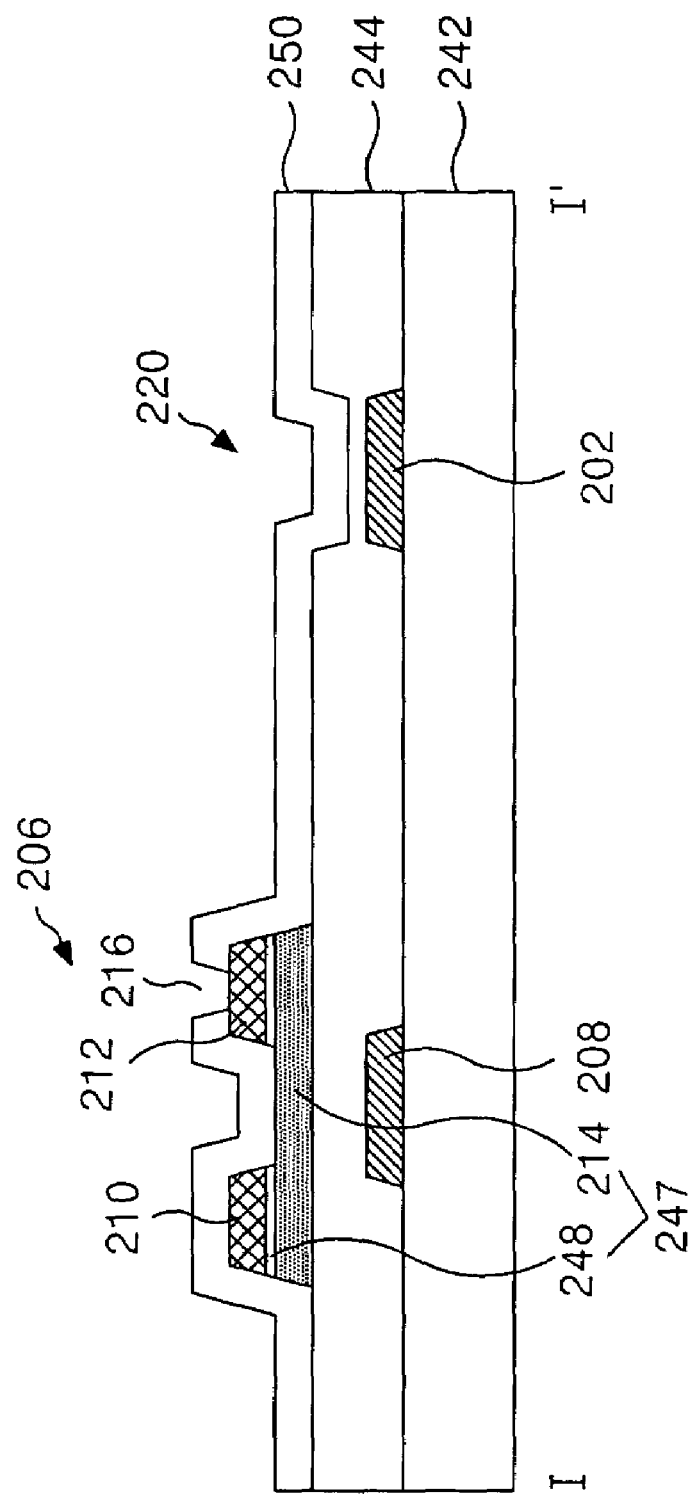
Figure 10E:
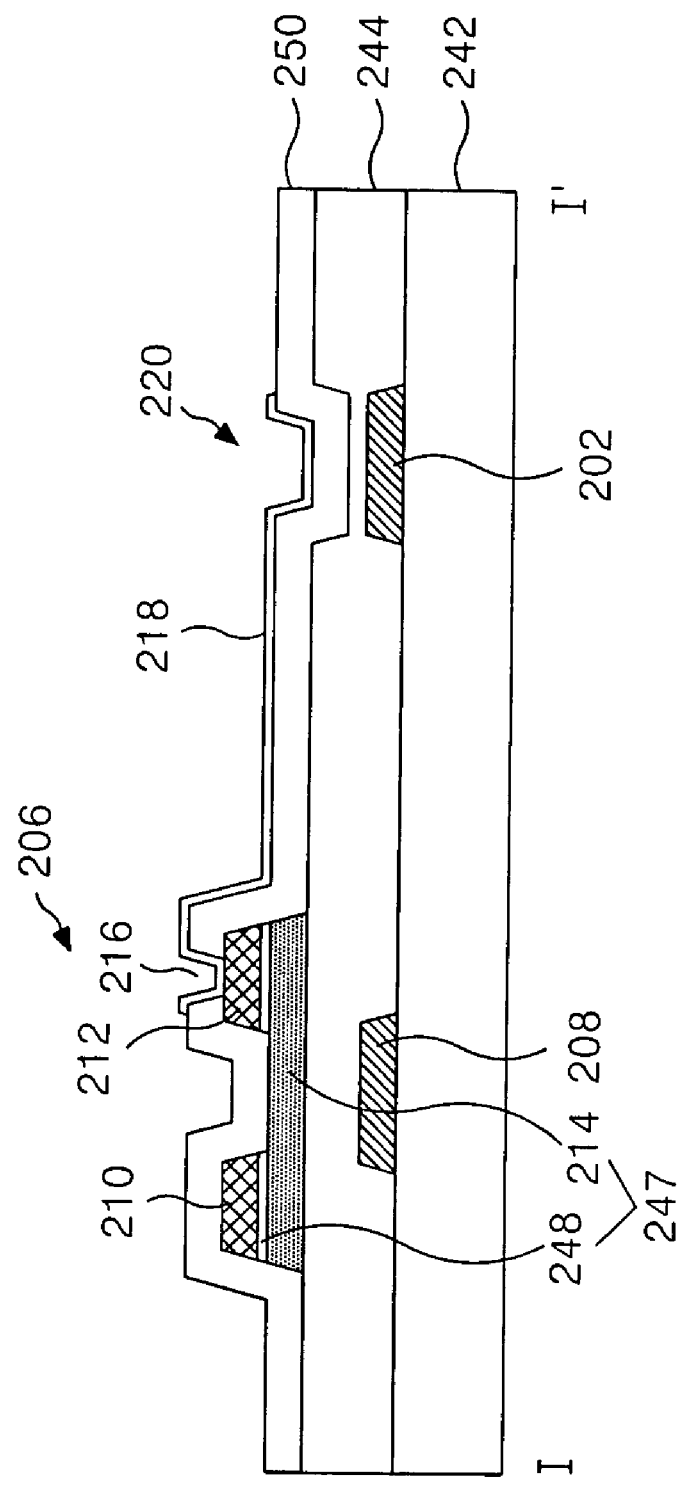

In FIG. 10C, a source/drain pattern including the data line (not shown), the source electrode 210 and the drain electrode 212 are formed on the source/drain metal layer, and the semiconductor pattern 247 including the ohmic contact layer 248 and the active layer 214 is formed on the lower portion of the source/drain pattern by a photolithography process and a etching process using a diffractive mask.

Alternatively, the semiconductor pattern 247 may be formed individually with the source/drain pattern using a separate mask process.

A protective film 250 is formed entirely on the organic gate insulating film 244 provided with the source/drain patterns by a deposition technique such as the PECVD, etc. Then, the protective film 250 is patterned by a photolithography process and a etching process to provide a contact hole 216 shown in FIG. 10D. The contact hole 216 passes through the protective film 250 and is formed in such a manner to expose the drain electrode 212.

A transparent electrode material is formed entirely on the protective film 250 by a deposition technique such as sputtering, etc. Then, the transparent electrode material is patterned by a photolithography process and a etching process to provide the pixel electrode 218 shown in FIG. 10E. The pixel electrode 218 is electrically connected, via the contact hole 216, to the drain electrode 212. Also, the pixel electrode 218 is formed in such a manner to overlap with a pre-stage gate line 202 having an area with a relatively thin thickness of the organic gate insulating films 244 and the protective film 250 therebetween to consist of the storage capacitor 220.

On the other hand, the method for fabricating the thin film pattern according to the present invention is not limited to the liquid crystal display device LCD in this description, and may be used at a process of any display device such as a field emission display (FED), a plasma display panel (PDP) and an electro-luminescence (EL), etc.

As described above, in the method for fabricating the flat panel display device according to the present invention, the organic material pattern having step coverage is formed using a master mold and a surface energy between the materials, not a photo process. Accordingly, it becomes possible to adjust a capacitance value of a capacitor.

Also, such stepped organic material pattern is used at the storage capacitor in the thin film transistor array substrate to maximize the capacitance value of the storage capacitor. Thus, it becomes possible to improve a picture quality.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a thin film pattern, comprising:
   forming a first conductive thin film pattern on a substrate;
   forming a master mold provided with a second thin film pattern;
   coating an organic material on the master mold provided with the second thin film pattern;
   joining the substrate and the master mold in such a manner to contact the first thin film pattern and a surface of the substrate with the organic material;
   hardening the organic material; and
   separating the substrate from the master mold to provide an organic thin film pattern having step coverage formed by the second thin film pattern on the substrate provided with the first thin film pattern.

2. The method as claimed in claim 1, wherein a surface energy of the substrate is greater than a surface energy of the organic material and the master mold.

3. The method as claimed in claim 1, wherein a surface of the substrate is treated by $O_2$ plasma to have a hydrophilic property.

4. The method as claimed in claim 2, wherein the surface energy of the substrate is approximately 70~100 mN/m.

5. The method as claimed in claim 1, wherein the organic material coated on the master mold is a resin of a liquid high polymer precursor and includes at least one photoinitiator of an Acrlate-group monomer, a phosphine oxide and a ketone.

6. The method as claimed in claim 5, wherein the Acrlate-group monomer content within the organic material is approximately 90~98%, and at least one content of the phosphine oxide and the ketone is approximately 2~10%.

7. The method as claimed in claim 2, wherein the surface energy of the organic material is approximately 20~45 mN/m.

8. The method as claimed in claim 1, wherein a surface of the master mold is treated by one of $CF_4$ plasma or $SF_6$ plasma to have a hydrophobic property.

9. The method as claimed in claim 2, wherein the surface energy of the master mold is approximately 15~40 mN/m.

10. The method as claimed in claim 6, wherein the Acrlate-group monomer of the organic material is hydrophilic.

11. The method as claimed in claim 1, further includes forming an adhesive at the surface of the organic material after coating the organic material on the master mold provided with the second thin film pattern.

12. A method for fabricating a flat panel display device comprising:
    forming a gate line, and a gate pattern including a gate electrode contacted with the gate line on a substrate;
    preparing a master mold including a designated thin film pattern;
    coating an organic material on the master mold provided with the thin film pattern;
    joining the substrate and the master mold in such a manner to contact the gate pattern and a surface of the substrate with the organic material, and in such a manner to face the thin film pattern and the gate line to each other;
    hardening the organic material; and
    separating the substrate and the master mold to provide an organic gate insulating film having a relatively thin thickness at an area that is overlapped with the gate line on the substrate.

13. The method as claimed in claim 12, wherein a surface energy of the substrate is greater than a surface energy of the organic material and the master mold.

14. The method as claimed in claim 12, wherein the surface of the substrate is treated by $O_2$ plasma to have a hydrophilic property.

15. The method as claimed in claim 13, wherein the surface energy of the substrate is approximately 70~100 mN/m.

16. The method as claimed in claim 12, wherein the organic material coated on the master mold is a resin of a liquid high polymer precursor and includes at least one photoinitiator of an Acrlate-group monomer, a phosphine oxide and a ketone.

17. The method as claimed in claim 16, wherein the Acrlate-group monomer content within the organic material is approximately 90~98%, and at least one content of the phosphine oxide and the ketone is approximately 2~10%.

18. The method as claimed in claim 13, wherein the surface energy of the organic material is approximately 20~45 mN/m.

19. The method as claimed in claim 12, wherein the surface of the master mold is treated by one of $CF_4$ plasma or $SF_6$ plasma to have a hydrophobic property.

20. The method as claimed in claim 13, wherein the surface energy of the master mold is approximately 15~40 mN/m.

21. The method as claimed in claim 17, wherein the Acrlate-group monomer of the organic material is hydrophilic.

22. The method as claimed in claim 17, further includes forming an adhesive at the surface of the organic material after coating the organic material on the master mold provided with the thin film pattern.

23. The method as claimed in claim 12, further including:
   forming a semiconductor pattern on the organic gate insulating film;
   forming a source electrode, a drain electrode and a data line crossing the gate line on the semiconductor pattern;
   forming a protective film having a contact hole for exposing the drain electrode; and
   forming a pixel electrode for comprising a storage capacitor along with the gate line with having an organic gate insulating film contacted, via the contact hole, with the drain electrode, and having a relatively thin thickness therebetween.

* * * * *